United States Patent
Li et al.

(10) Patent No.: US 9,979,521 B2
(45) Date of Patent: May 22, 2018

(54) DOWNLINK RESOURCE INDICATION METHOD, APPARATUS AND SYSTEM FOR MULTIPLE-POINT-COORDINATION NETWORK IN LTE SYSTEM

(71) Applicant: ZTE CORPORATION, Shenzhen, Guangdong Province (CN)

(72) Inventors: Nan Li, Shenzhen (CN); Chen Huang, Shenzhen (CN); Dongying Zhang, Shenzhen (CN); Zhen Ren, Shenzhen (CN); Peng Geng, Shenzhen (CN); Gang Qiu, Shenzhen (CN); Yufeng Ruan, Shenzhen (CN); Fang Zhang, Shenzhen (CN); Xi Yuan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 79 days.

(21) Appl. No.: 15/038,044

(22) PCT Filed: Jun. 18, 2014

(86) PCT No.: PCT/CN2014/080210
§ 371 (c)(1),
(2) Date: May 20, 2016

(87) PCT Pub. No.: WO2015/074413
PCT Pub. Date: May 28, 2015

(65) Prior Publication Data
US 2016/0308648 A1    Oct. 20, 2016

(30) Foreign Application Priority Data
Nov. 22, 2013   (CN) .......................... 2013 1 0598013

(51) Int. Cl.
*H04W 72/04* (2009.01)
*H04L 5/00* (2006.01)
(Continued)

(52) U.S. Cl.
CPC ........... *H04L 5/0035* (2013.01); *H04B 7/024* (2013.01); *H04L 5/0048* (2013.01);
(Continued)

(58) Field of Classification Search
CPC ... H04L 5/0035; H04L 5/0048; H04L 5/0091; H04W 72/042; H04W 72/04; H04B 7/024
See application file for complete search history.

(56) References Cited

U.S. PATENT DOCUMENTS

| 9,276,709 B2 * | 3/2016 | Mazzarese ............ H04L 5/0023 |
| 9,635,705 B2 * | 4/2017 | Lu ......................... H04W 84/00 |
| 2012/0163334 A1 * | 6/2012 | Miki ...................... H04L 5/001 370/330 |

FOREIGN PATENT DOCUMENTS

| CN | 101777941 A | 7/2010 |
| CN | 102884748 A | 1/2013 |

(Continued)

OTHER PUBLICATIONS

Texas Instruments; Transmit-side Signaling Enhancements Targeting Het-Nets for Rel-11; 3GPP TSG RAN WG1 Meeting#66bis; Zhuhai, China, Oct. 10-14, 2011.R1-113244.
(Continued)

*Primary Examiner* — Wei Zhao
(74) *Attorney, Agent, or Firm* — Ling Wu; Stephen Yang; Ling and Yang Intellectual Property (57) ABSTRACT

The present document discloses a method, apparatus and system for indicating downlink resources of a coordinated multi-point network in an LTE system. The method includes: determining a control station/cell and a service
(Continued)

station/cell of a User Equipment (UE); and indicating through signaling that a Physical Downlink Shared Channel (PDSCH) of the UE occupies radio resources of the service station/cell in a control region, whereby a start position of the PDSCH allocated for the UE by the service station/cell is the first symbol of a subframe, and when a resource mapping in the control region is performed, the PDSCH does not occupy Resource Elements (REs) occupied by a Cell Reference Signal (CRS), a Physical Control Format Indicator Channel (PCFICH), a Physical Hybrid-ARQ Indicator Channel (PHICH) of a station/cell where the PDSCH is located, and a Physical Downlink Control Channel PDCCH of the UE.

14 Claims, 5 Drawing Sheets

(51) Int. Cl.
*H04B 7/024* (2017.01)
*H04W 72/00* (2009.01)

(52) U.S. Cl.
CPC ........... *H04L 5/0091* (2013.01); *H04W 72/00* (2013.01); *H04W 72/042* (2013.01); *H04L 5/0053* (2013.01)

(56) References Cited

FOREIGN PATENT DOCUMENTS

| | | |
|---|---|---|
| CN | 103220802 A | 7/2013 |
| WO | WO2012140309 A1 | 10/2012 |
| WO | WO2013112829 A1 | 8/2013 |
| WO | 2013157894 A1 | 10/2013 |

OTHER PUBLICATIONS

Huawei, HiSilicon; Remaining details of EPDCCH/PDSCH start symbol configuration; 3GPP TSG RAN WG1 Meeting #70bis, San Diego, USA, Oct. 8-12, 2012.R1-124080.

Intel Corporation; EPDCCH impact on UE demodulation performance-EPDCCH test scenarios. 3GPP TSG RAN WG4 Meeting#67; Fukuoa, Japan, May 20-24, 2013. R4-132283.

\* cited by examiner

DOWNLINK RESOURCE INDICATION METHOD, APPARATUS AND SYSTEM FOR MULTIPLE-POINT-COORDINATION NETWORK IN LTE SYSTEM

TECHNICAL FIELD

The present document relates to the field of wireless communication technology, and specifically, to a method, apparatus and system for indicating downlink resources of a coordinated multi-point network in a Long-Term Evolution (LTE) system.

BACKGROUND OF THE RELATED ART

In the LTE and Long-Term Evolution-Advanced (LTE-A) systems, downlink system resources are divided into two parts, i.e., a control region and a data region. Herein the control region is primarily used for transmitting control signals of a system or a User Equipment (UE), which comprise a Common Reference Signal (CRS), a Physical Control Format Indicator Channel (PCFICH), a Physical Hybrid-ARQ Indicator Channel (PHICH), a Physical Downlink Control Channel (PDCCH) or the like. The data region is primarily used for transmitting a Physical Downlink Shared Channel (PDSCH) of the UE.

Figure 1:
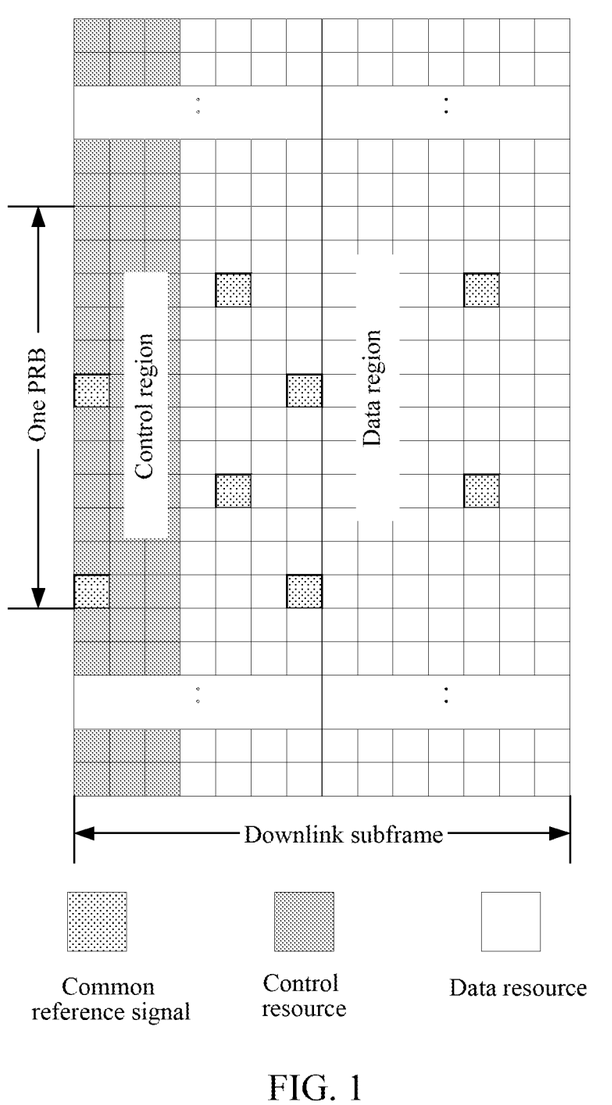
FIG. 1 is a structural diagram of a downlink subframe in an LTE system in the prior art.

For the LTE system, one downlink subframe comprises 14 Orthogonal Frequency Division Multiplexing (OFDM) symbols, wherein the first 1-3 OFDM symbols are the control region, and the number of OFDM symbols occupied by the control region is notified by a base station to the UE through the PCFICH channel. Except for the control region, the remaining OFDM symbols are used as the data region to transmit the PDSCH. A diagram of the control region and the data region is shown in FIG. 1.

When the network schedules downlink services of a user and allocates the downlink radio resources, the base station transmits scheduling information to the UE through the PDCCH channel. The resource positions in the scheduling information only comprise positions in the frequency domain allocated to the UE, and in the time domain, resource positions are remaining OFDM symbols excluding the control region by default for the UE. For example, the control region occupies the first 3 OFDM symbols, and then the $4^{th}$ to $14^{th}$ OFDM symbols in the time domain belong to the data region by default for the UE, i.e., the data region occupies 11 OFDM symbols.

The coordinated multi-point network in the LTE system refers to that different stations/cells transmit information to the same UE in the LTE system. Different stations/cells may transmit the same information to the same UE for example downlink Joint Transmission (JT) transmission technology in the Coordinated Multi-Point (CoMP). Different stations/cells may also transmit different information to the same UE, for example, one station/cell transmits the PDCCH to a UE, and another station/cell transmits the downlink PDSCH to the UE. The coordinated multi-point network described here refers to a scenario where different stations/cells transmit different information to the same UE, for example, one station/cell transmits the PDCCH to a UE, and another station/cell transmits the PDSCH to the UE. A station/cell which transmits the PDCCH to a UE is referred to as a control station/cell, and a station/cell which transmits the PDSCH to a UE is referred to as a service station/cell. In the coordinated multi-point network, when the station/cell which transmits the PDSCH to the UE doesn't need to transmit a control channel such as the PDCCH or the like, the control region thereof is idle and cannot transmit the PDSCH, which wastes valuable radio resources.

In the LTE-A system, characteristics of carrier aggregation are introduced, and cross-carrier scheduling is allowed, i.e., using the PDCCH transmitted on one carrier to schedule the PDSCH on another carrier. At this time, the PDCCH and the PDSCH of the UE are on different carriers respectively, and a carrier on which the PDCCH is transmitted to the UE is referred to as a control carrier, and a carrier on which the PDSCH is transmitted to the UE is referred to as a service carrier. If the carrier on which the PDSCH is transmitted have no control channel for transmission, the control region thereof is idle, which wastes valuable radio resources.

Further, in order to better ensure transmission quality of control information of the Pico station, an enhanced Physical Downlink Control Channel ePDCCH is introduced in the standard Release 11 (R11) of the 3rd Generation Partnership Project (3GPP). The ePDCCH has the same function and purpose as those of the PDCCH in the standard R8/9 of the 3GPP, and may be used to indicate the scheduling information of the PDSCH or PDSCH of a UE. However, resource positions of the ePDCCH are different from those of the PDCCH/PHICH of the 3GPP standard RS/9 release, and the ePDCCH no longer transmits in the control region of backward compatible carriers, and instead, transmits Downlink Control Information (DCI) information by sharing the data region in the 3GPP standard R8/9 with the PDSCH by means of Frequency Division Multiplexing (FDM); additionally, the ePDCCH also no longer uses a Cell-specific Reference Signal (CRS) for demodulation, and instead, uses a Demodulation Reference Signal (DMRS) for demodulation. The ePDCCH can not only exist in compatible carriers, but also can be a New Carrier Type (NCT) of downlink control channel. When the ePDCCH is used for controlling scheduling, if there is no need to transmit a control channel of another UE in a control region of the cell, the PDSCH also cannot use the resources in control region, and thus there is also a problem of a waste of radio resources.

SUMMARY

At least on one hand, in order to solve the problem of a waste of resources in a control region of a service station/cell when the control region of the service station/cell is idle, or on the other hand, in order to solve the problem of a waste of radio resources due to being incapable of using the resources in the control region by a PDSCH if there is no need to transmit a control signal in the control region of the service station/cell when an ePDCCH is used for controlling scheduling, the embodiments of the present document provide a method, apparatus and system for indicating downlink resources of a coordinated multi-point network in an LTE system.

The method for indicating downlink resources of a coordinated multi-point network in an LTE system provided by the embodiments of the present document comprises:

determining a control station/cell and a service station/cell of a User Equipment (UE); and indicating through signaling that a Physical Downlink Shared Channel (PDSCH) of the UE occupies radio resources of the service station/cell in a control region, whereby a start position of the PDSCH allocated for the UE by the service station/cell is a first symbol of a subframe, and when a resource mapping in the control region is performed, the PDSCH does not occupy Resource Elements (REs) occupied by a Cell Reference Signal (CRS), a Physical Control Format Indicator Channel (PCFICH), a Physical Hybrid-ARQ Indicator Channel (PHICH) of a station/cell where the PDSCH is located and a Physical Downlink Control Channel (PDCCH) of the UE.

Preferably, determining a control station/cell and a service station/cell of a UE comprises:

determining which station/cell in the system is the control station/cell of the UE and which station/cell in the system is the service station/cell of the UE.

Preferably, if the control station/cell and the service station/cell of the UE are not the same station/cell, that the PDSCH of the UE occupies the radio resources of the service station/cell in the control region are occupied by the PDSCH of the UE may be indicated through the signaling.

Preferably, if that the PDSCH of the UE does not occupy the radio resources of the service station/cell in the control region is indicated through the signaling, the start position of the PDSCH allocated for the UE by the service station/cell is indicated by signaling CFI, epdcch-StartSymbol-r11, pdsch-Start-r10 or $l_{EPDCCHStart}$ according to existing standards.

Preferably, a strategy of indicating through the signaling that a PDSCH of the UE occupies radio resources of the service station/cell which does not transmit a control channel in the control region is:

when the control station/cell transmits a PDCCH to the UE, adding a flag bit $PDSCH_{extension\ flag}$ in scheduling information DCI of the PDCCH channel for indicating that a PDSCH corresponding to the PDCCH can use the radio resources of the service station/cell in the control region;

or, when the control station/cell transmits a Radio Resource Control (RRC) signaling to the UE, adding a flag field $PDSCH_{extension\ field}$ in the RRC signaling for indicating that the PDSCH of the UE can use the radio resources of the service station/cell in the control region;

or, when the control station/cell transmits an enhanced Physical Downlink Control Channel (ePDCCH) to the UE, adding a flag bit $ePDSCH_{extension\ flag}$ DCI of the ePDCCH channel for indicating that a PDSCH corresponding to the ePDCCH can use the radio resources of the service station/cell in the control region.

Preferably, the $PDSCH_{extension\ flag}$, the $PDSCH_{extension\ field}$ or the $ePDSCH_{extension\ flag}$ has a length of 1 bit, and a value of the bit is used to indicate whether the PDSCH can use the radio resources in the control region.

An apparatus for indicating downlink resources of a coordinated multi-point network in an LTE system provided by the embodiments of the present document comprises:

a determination unit configured to determine a control station/cell and a service station/cell of a User Equipment (UE); and a processing unit configured to indicate through signaling that a Physical Downlink Shared Channel (PDSCH) of the UE occupies radio resources of the service station/cell in a control region, whereby a start position of the PDSCH allocated for the UE by the service station/cell is a first symbol of a subframe, and when a resource mapping in the control region is performed, the PDSCH does not occupy Resource Elements (REs) occupied by a Cell Reference Signal (CRS), a Physical Control Format indicator Channel (PCFICH), a Physical Hybrid-ARQ Indicator Channel (PHICH) of a station/cell where the PDSCH is located and a Physical Downlink Control Channel PDCCH of the UE.

Preferably, determining a control station/cell and a service station/cell of a UE by the determination unit comprises:

determining which station/cell in the system is the control station/cell of the UE and which station/cell in the system is the service station/cell of the UE.

Preferably, if the determination unit determines that the control station/cell and the service station/cell of the UE are not the same station/cell, the determination unit can transmit a notification to the processing unit to notify that the processing unit can indicate through the signaling that the PDSCH of the UE occupies the radio resources of the service station/cell in the control region.

Preferably, if the processing unit indicates through the signaling that the PDSCH of the UE does not occupy the radio resources of the service station/cell in the control region, the start position of the PDSCH allocated for the UE by the service station/cell is indicated by signaling CFI, epdcch-StartSymbol-r11, pdsch-Start-r10 or $l_{EPDCCHStart}$ according to existing standards.

Preferably, a strategy of indicating by the processing unit through the signaling that the PDSCH of the UE occupies the radio resources of the service station/cell which does not transmit a control channel in the control region is:

when the control station/cell transmits a PDCCH to the UE, adding, by the processing unit, a flag hit $PDSCH_{extension\ flag}$ in scheduling information DCI of the PDCCH channel for indicating that a PDSCH corresponding to the PDCCH can use the radio resources of the service station/cell in the control region;

or, when the control station/cell transmits a Radio Resource Control (RRC) signaling to the UE, adding, by the processing unit, a flag field $PDSCH_{extension\ field}$ in the RRC signaling for indicating that the PDSCH of the UE can use the radio resources of the service station/cell in the control region;

or, when the control station/cell transmits an enhanced Physical Downlink Control Channel (ePDCCH) to the UE, adding, by the processing unit, a flag bit $ePDSCH_{extension\ flag}$ in DCI of the ePDCCH channel for indicating that a PDSCH corresponding to the ePDCCH can use the radio resources of the service station/cell in the control region.

Preferably, the $PDSCH_{extension\ flag}$, the $PDSCH_{extension\ field}$ or the $ePDSCH_{extension\ flag}$ has a length of 1 bit, and a value of the bit is used to indicate whether the PDSCH can use the radio resources in the control region.

A wireless communication system provided by the embodiments of the present document comprises the apparatus for indicating downlink resources of a coordinated multi-point network in an LTE system as described above, the apparatus comprising:

a determination unit configured to determine a control station/cell and a service station/cell of a User Equipment (UE); and a processing unit configured to indicate through signaling that a Physical Downlink Shared Channel (PDSCH) of the UE occupies radio resources of the service station/cell in a control region, whereby a start position of the PDSCH allocated for the UE by the service station/cell is a first symbol of a subframe, and when a resource mapping in the control region is performed, the PDSCH does not occupy Resource Elements (REs) occupied by a Cell. Reference Signal (CRS), a Physical Control Format Indicator Channel (PCFICH), a Physical Hybrid-ARQ Indicator Channel (PHICH) of a station/cell where the PDSCH is located and a Physical Downlink Control Channel (PDCCH) of the UE.

The embodiments of the present document further provide a computer readable storage medium comprising a set of computer executable instructions for implementing the method for indicating downlink resources of a coordinated multi-point network in an LTE system according to the embodiments of the present document.

It can be seen from the technical solutions according to the embodiments of the present document as described above, the method for indicating downlink resources provided by the embodiments of the present document indicates, when a PDSCH is transmitted by a service station/cell which does not transmit a control channel to a UE, whether the PDSCH can be transmitted to the UE on resources in a control region, so as to make use of radio resources, and improve the throughput and system capacity of the cell.

SPECIFIED EMBODIMENTS

The technical solutions of the present document will be further described in detail below in conjunction with accompanying drawings and specific embodiments, so that those skilled in the rat can better understand and implement the present document. However, the listed embodiments are not intended to limit the present document.

Figure 2:
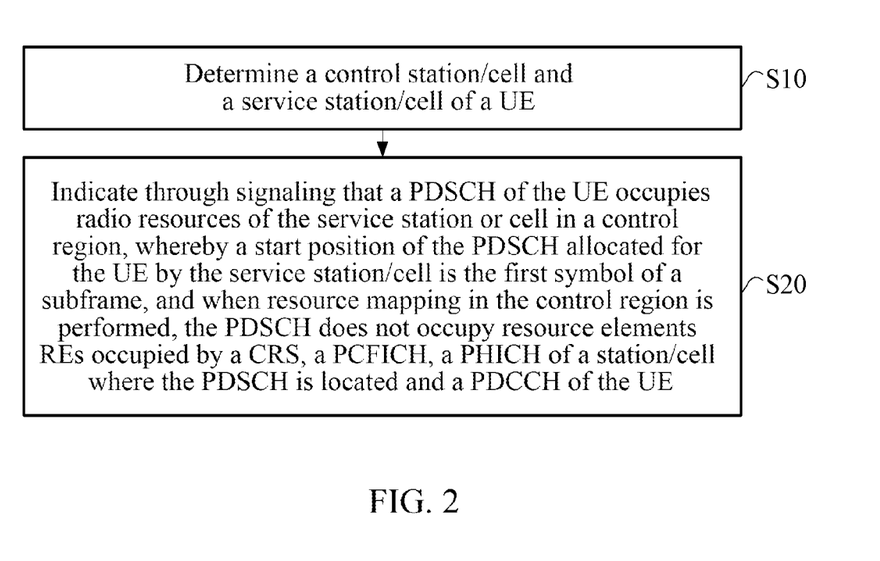
FIG. 2 is a flowchart diagram of a method for indicating downlink resources of a coordinated multi-point network in an LTE system according to an embodiment of the present document.

As shown in FIG. 2, a method for indicating downlink resources of a coordinated multi-point network in an LTE system according to an embodiment of the present document comprises the following steps:

in S10, it is to determine a control station/cell and a service station/cell of a UE;

in S20, it is to indicate through signaling that a PDSCH of the UE occupies radio resources of the service station/cell which does not transmit a control channel in a control region, whereby a start position of the PDSCH allocated for the UE by the service station/cell is the first symbol of a subframe, and when a resource mapping in the control region is performed, the PDSCH does not occupy resource elements REs occupied by a CRS, a PCFICH, a PHICH of a station/cell where the PDSCH is located and a PDCCH of the UE.

When a PDSCH is transmitted by a base station to a UE, the method for indicating downlink resources according to the present embodiment may be used to indicate that the PDSCH can be transmitted to the UE on resources of a service station/cell which does not transmit a control channel in a control region in a coordinated multi-point network, so as to make full use of radio resources, and improve the throughput and system capacity of the cell.

Specifically, the method for indicating downlink resources according to the present embodiment primarily comprises the steps as follows:

In a first step, a control station/cell and a service station/cell of a UE are determined.

The system determines the control station/cell and the service station/cell of the UE respectively. For example, for one given UE, the system determines which station/cell in the system is the control station/cell of the UE and which station/cell in the system is the service station/cell of the UE, and further determines whether the control station/cell and the service station/cell of the UE are the same station/cell or not.

The control station/cell is a station/cell which transmits a PDCCH to the UE, so the control station/cell cannot use the radio resources in the control region to transmit a PDSCH of a user to the UE. The service station/cell is a station/cell which transmits the PDSCH to the UE. If the control station/cell and the service station/cell of the UE are not the same station/cell, the service station/cell doesn't need to transmit the PDCCH. Therefore, the service station/cell can use the radio resources in the control region to transmit the PDSCH of users to the UE.

In a second step, control information is indicated.

It is to indicate through the signaling whether the PDSCH of the UE occupies the radio resources of the service station/cell which does not transmit a control channel in the control region. The radio resources in the control region being not used by the PDSCH of the UE means that the start position of the PDSCH of the UE is indicated by signaling CFI, epdcch-StartSymbol-r11, pitch-Start-r10 or $l_{EPDCCHStart}$ or the like according to existing standards; and the radio resources in the control region being used by the PDSCH of the UE means that the start position of the PDSCH of the UE is the first symbol of a subframe, and when a resource mapping in the control region is performed, the PDSCH does not occupy resources elements REs occupied by a CRS, a PCFICH, a PHICH of a carrier and a PDCCH of the UE.

The way of indicating through the signaling whether the PDSCH of the UE occupies the radio resources of the service station/cell which does not transmit a control channel in the control region, comprises but is not limited to the following manners:

In a first manner, when the control station/cell transmits the PDCCH to the UE, a flag bit, i.e. PDSCHextension flag, is added in scheduling information Downlink Control Information (DCI) of the PDCCH channel. The PDSCHextension flag has a length of 1 bit, and the bit indicates whether the PDSCH corresponding to the PDCCH can use the radio resources in the control region. For example, that the value of the bit is "0" represents that the PDSCH corresponding to the PDCCH cannot use the radio resources in the control region, and that the value of the bit is "1" represents that the PDSCH corresponding to the PDCCH can use the radio resources in the control region; or that the value of the bit is "1" represents that the PDSCH corresponding to the PDCCH cannot use the radio resources in the control region, and that the value of the bit is "0" represents that the PDSCH corresponding to the PDCCH can use the radio resources in the control region. If there is no flag bit of PDSCH extension flag in the scheduling information DCI of the PDCCH channel, the PDSCH corresponding to the PDCCH cannot use the radio resources in the control region by default.

The radio resources in the control region being not used by the PDSCH corresponding to the PDCCH means that the start position of the PDSCH corresponding to the PDCCH is indicated by signaling CFI, epdcch-StartSymbol-r11, pdsch-Start-r10 or $l_{EPDCCHSta}$ or the like according to existing standards; and the radio resources in the control region being used by the PDSCH corresponding to the PDCCH means that the start position of the PDSCH corresponding to the PDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In a second manner, when the control station/cell transmits RRC signaling to the UE, a flag field, i.e. PDSCH extension field, is added in the RRC signaling. The PDSCH extension field has a length of 1 bit, and the bit indicates whether the PDSCH of the UE can use the radio resources in the control region. For example, that the value of the bit is "0" represents that the PDSCH of the UE cannot use the radio resources in the control region, and that the value of the bit is "1" represents that the PDSCH of the UE can use the radio resources in the control region; or that the value of the bit is "1" represents that the PDSCH of the UE cannot use the radio resources in the control region, and that the value of the bit is "0" represents that the PDSCH of the UE can use the radio resources in the control region. If there is no flag field PDSCH extension field in the RRC signaling, the PDSCH of the UE cannot use the radio resources in the control region by default.

The radio resources in the control region being not used by the PDSCH of the UE means that the start position of the PDSCH corresponding to the PDCCH is indicated by signaling CFI, epdcch-StartSymbol-r11, pdsch-Start-r10 or $l_{EPDCCHStart}$ or the like according to existing standards; and the radio resources in the control region being used by the PDSCH corresponding to the PDCCH means that the start position of the PDSCH corresponding to the PDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In a third manner, when the ePDCCH is transmitted to the UE, a flag bit, i.e. $ePDSCH_{extension\ flag}$, is added in scheduling information DCI of the ePDCCH channel. The $ePDSCH_{extension\ flag}$ has a length of 1 bit, and the bit indicates whether the PDSCH corresponding to the ePDCCH can use the radio resources in the control region. For example, that the value of the bit is "0" represents that the PDSCH corresponding to the ePDCCH cannot use the radio resources in the control region, and that the value of the bit is "1" represents that the PDSCH corresponding to the ePDCCH can use the radio resources in the control region; or that the value of the bit is "1" represents that the PDSCH corresponding to the ePDCCH cannot use the radio resources in the control region, and that the value of the bit is "0" represents that the PDSCH corresponding to the ePDCCH can use the radio resources in the control region. If there is no flag bit PDSCH extension flag in the scheduling information DCI of the ePDCCH channel, the PDSCH corresponding to the ePDCCH cannot use the radio resources in the control region by default.

The radio resources in the control region being not used by the PDSCH corresponding to the ePDCCH means that the start position of the PDSCH corresponding to the ePDCCH is indicated by signaling CFI, epdcch-StartSymbol-r11, pdsch-Start-r10 or $l_{EPDCCHStart}$ or the like according to existing standards; and the radio resources in the control region being used by the PDSCH corresponding to the ePDCCH means that the start position of the PDSCH corresponding to the ePDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In a third step, resources are allocated and data is mapped.

If the service station/cell does not use the resources in the control region to transmit the PDSCH to the UE, the start position of the PDSCH allocated for the UE by the service station/cell is indicated by signaling CFI, epdcch-StartSymbol-r11, pdsch-Start-r10 or $l_{EPDCCHStart}$.

If the service station/cell uses the resources in the control region to transmit the PDSCH to the UE, the start position of the PDSCH allocated for the UE by the service station/cell is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In order to enable readers to more clearly and thoroughly understand the inventive spirit of the present document, the present document will be further described below in conjunction with specific embodiments and accompanying drawings.

Embodiment One

Figure 3:
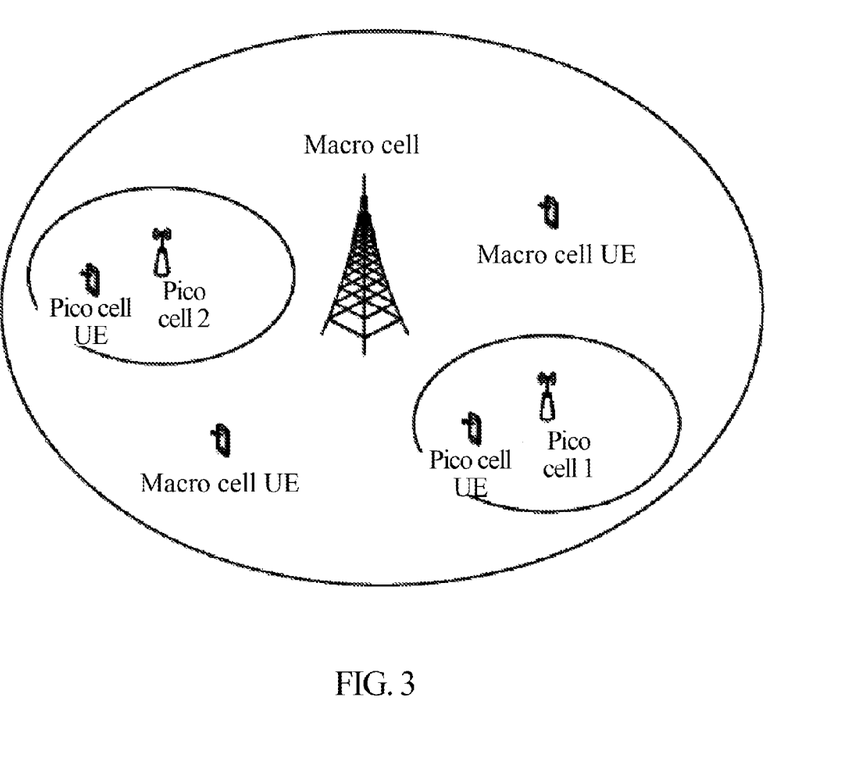
FIG. 3 is a structural diagram of a Heterogeneous Network (HetNet) in an LTE system according to an embodiment of the present document.

With the continuous development of mobile Internet and the popularity of intelligent terminals, data services of mobile communication grow explosively. In order to solve the requirements for large capacity of data in hot spots, the Heterogeneous Net (HetNet) technology of the LTE system is a very efficient solution. Especially, a co-frequency HetNet can effectively improve the spectrum efficiency, it is also an important research direction in the current 3GPP standard. The HetNet refers to that some Low Power Nodes (LPNs) are added in some hotspots in a Macro cell range covered by a macro base station with large power, so as to achieve the purpose of increasing the system capacity in the hot spots. In the present embodiment, the co-frequency HetNet is taken as an example. In the present embodiment 1, a Pico base station with small power being an LPN is taken as an example. For example, FIG. 3 illustrates a diagram of the HetNet.

In the HetNet of the LTE system, a Pico Cell is deployed in a Macro, which can increase the capacity of the hot spots. The Macro and the Pico may be set to have the same Cell ID, and at this time, the Macro and the Pico are considered to belong to the same logic cell. As the coverage range of the Macro is relatively large, the Macro can control all UEs in the coverage region, while the Pico can act as a service station for the hot spot. At this time, a manner for resource configuration as follows may be used: only the Macro transmits a reference signal CRS and a control channel, and the Pico doesn't need to transmit the CRS and the control channel. Control information of a Pico UE in the coverage region of the Pico is transmitted by the Macro, and service data of the Pico UE is transmitted by the Pico. In this way, a separating technology for control and services of the Pico UE can be achieved by the system. This scenario is a coordinated multi-point scenario where the Macro and the Pico transmit different information to the Pico UE. FIG. 3 illustrates a diagram of such transmission manner.

Figure 4:
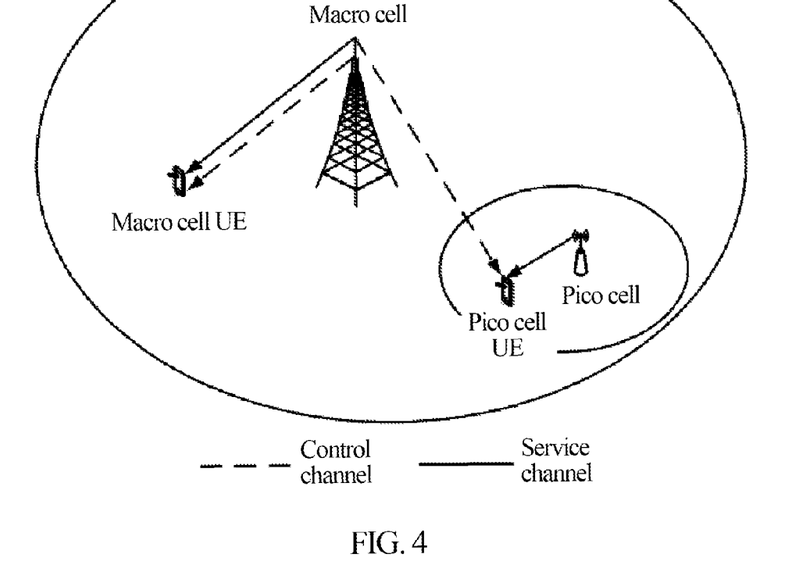
FIG. 4 is a diagram of transmission in a HetNet network according to an embodiment of the present document.

In the diagram of FIG. 4, no matter whether for the Macro UE in the coverage region of the Macro or the Pico UE in the coverage region of the Pico, radio resources are scheduled and allocated by a scheduler of the Macro, Both the control information and the downlink service data of the Macro UE are transmitted by the Macro. The control information of the Pico UE is transmitted by the Macro, and the downlink service data of the Pico UE is transmitted by the Pico.

As the control information of the Pico UE is transmitted by the Macro, the Macro needs to transmit Control Format Indication (CFI) information to the Pico UE on a PCFICH channel, i.e., the number of OFDM symbols occupied by the control region in the current subframe. And the whole cell can only have a unique CFI value. According to the current existing resource allocation way, in one downlink subframe, that OFDM symbols after the CFI are a data region by default for the Pico UE. For example, assuming CFI=3, the $4^{th}$ to $14^{th}$ OFDM symbols (totally 11 OFDM symbols) are data resources by default for the Pico UE. Although the Pico doesn't need to transmit the CRS and the control information on the to $1^{st}$ $3^{rd}$ OFDM symbols, the Pico still cannot use these resources to transmit data services of the Pico UE, which results in a waste of radio resources. According to the current existing resource allocation way, if CFI=3, in each downlink subframe, the Pico can only use 11 OFDM symbol resources for effective service data transmission, that is, there is only a resource utilization of 11/14=78.57%. If the Pico can make full use of these radio resources, the throughout and the spectrum efficiency of the Pico cell can be largely increased, thereby further enhancing the data rate and the Quality of Service (QoS) of users in a hot spot.

The specific implementation method of the present embodiment will continuously be described below with reference to the diagram illustrated in FIG. 3 and the present embodiment.

In FIG. 4, there is one Pico in a coverage range of the Macro Cell, there is one Macro UE in a coverage range of the Macro, and there is one Pico UE in a coverage range of the Pico.

At the Macro Side

In a first step, a control station and a service station of a UE are determined.

In the present embodiment, the Macro transmits a PDCCH to the Macro UE and the Pico UE, and the Pico doesn't need not to transmit the PDCCH; a PDSCH of the Macro UE is transmitted by the Macro, and a PDSCH of service data of the Pico UE is transmitted by the Pico. Therefore, the Macro is the control station of the Macro UE and the Pico UE, the Macro is the service station of the Macro UE, and the Pico is the service station of the Pico UE.

In a second step, it is to indicate through the signaling whether the PDSCH of the UE occupies the radio resources in the control region.

The radio resources in the control region being not used by the PDSCH of the UE means that the start position of the PDSCH of the UE is indicated by signaling CFI, epdcch-StartSymbol-r11, pdsch-Start-r10 or $1_{EPDCCHStart}$ or the like according to existing standards; and the radio resources in the control region being used by the PDSCH of the UE means that the start position of the PDSCH of the UE is the first symbol of a subframe, and when a resource mapping in the control region is performed, the PDSCH does not occupy REs occupied by a CRS, a PCFICH, a PHICH and a PDCCH of the UE of a carrier.

The method of indicating through the signaling whether the PDSCH of the UE occupies the radio resources in the control region comprises but is not limited to the following manners:

In a first manner, when the Macro transmits the PDCCH to the UE, a flag bit, i.e. $PDSCH_{extension\ flag}$, is added in scheduling information DCI of the PDCCH channel. The $PDSCH_{extension\ flag}$ has a length of 1 bit, and the bit indicates whether the PDSCH corresponding to the PDCCH can use the radio resources in the control region. For example, that the value of the bit is "0" represents that the PDSCH corresponding to the PDCCH cannot use the radio resources in the control region, and that the value of the bit is "1" represents that the PDSCH corresponding to the PDCCH can use the radio resources in the control region; or that the value of the bit is "1" represents that the PDSCH corresponding to the PDCCH cannot use the radio resources in the control region, and that the value of the bit is "0" represents that the PDSCH corresponding to the PDCCH can use the radio resources in the control region. If there is no flag bit $PDSCH_{extension\ flag}$ in the scheduling information DCI of the PDCCH channel, the PDSCH corresponding to PDCCH cannot use the radio resources in the control ion by default.

The radio resources in the control region being not used by the PDSCH corresponding to the PDCCH means that the start position of the PDSCH corresponding to the PDCCH is indicated by signaling CFI, epdcch-StartSymbol-r11, pdsch-Start-r10 or $1_{EPDCCHStart}$ or the like according to existing standards; and the radio resources in the control region being used by the PDSCH corresponding to the PDCCH means that the start position of the PDSCH corresponding to the PDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In the present embodiment, for the Macro UE, as the Macro cannot use the resources in the control region to transmit the PDSCH to the Macro UE, in the PDCCH channel transmitted by the Macro to the Macro UE, the filling in the $PDSCH_{extension\ flag}$ is an indication that the radio resources in the control region cannot be used or there is no flag bit $PDSCH_{extension\ flag}$ in the scheduling information DCI of the PDCCH channel of the Macro UE, and the scheduling control information of the Macro UE, is transmitted to the Macro UE through the PDCCH channel.

For the Pico UE, if the resources in the control region are used by the scheduling to transmit the PDSCH to the Pico UE, in the PDCCH channel transmitted by the Macro to the Pico UE, the filling in the $PDSCH_{extension\ flag}$ is an indication that the radio resources in the control region are used and the scheduling control information of the Pico UE is transmitted to the Pico UE through the PDCCH channel. If the resources in the control region aren't used by the scheduling to transmit user service data to the Pico UE, in the PDCCH channel transmitted by the Macro to the Pico UE, the filling in the $PDSCH_{extension\ flag}$ is an indication that the radio resources in the control region cannot be used or there is no flag bit $PDSCH_{extension\ flag}$ in the scheduling information DCI of the PDCCH channel of the Pico UE, and the scheduling control information of the Pico UE is transmitted to the Pico UE through the PDCCH channel.

In a second manner, when the Macro transmits RRC signaling to the UE, a flag field, i.e. $PDSCH_{extension\ field}$, is added in the RRC signaling. The $PDSCH_{extension\ field}$ has a length of 1 bit, and the bit indicates whether the PDSCH of the UE can use the radio resources in the control region: for example, that the value of the bit is "0" represents that the PDSCH of the UE cannot use the radio resources in the control region, and that the value of the bit is "1" represents that the PDSCH of the UE can use the radio resources in the control region; or if the value of the bit is "1" represents that the PDSCH of the UE cannot use the radio resources in the control region, and that the value of the bit is "0" represents that the PDSCH of the UE can use the radio resources in the control region. If there is no flag field PDSCH$_{extension\ field}$ in the RRC signaling, the PDSCH of the UE cannot use the radio resources in the control region by default.

The radio resources in the control region being not used by the PDSCH of the UE means that the start position of the PDSCH of the UE is indicated by signaling CFI, epdcch-StartSymbol-r11, pdsch-Start-r10 or l$_{EPDCCHStart}$ or the like according to existing standards; and the radio resources in the control region being used by the PDSCH of the UE means that the start position of the PDSCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In the present embodiment, for the Macro UE, as the Macro cannot use the resources in the control region to transmit the PDSCH to the Macro UE, in the RRC signaling transmitted by the Macro to the Macro UE, the filling in the PDSCH$_{extension\ field}$ is an indication that the radio resources in the control region cannot be used or there is no flag field PDSCH$_{extension\ field}$ in the RRC signaling.

In the present embodiment, for the Pico UE, if the resources in the control region are used by the scheduling to transmit the PDSCH to the Pico UE, in the PDCCH channel transmitted by the Macro to the Pico UE, the filling in the PDSCH$_{extension\ field}$, is an indication that the radio resources in the control region are used. If the resources in the control region aren't used to transmit user service data to the Pico UE, in the RRC signaling transmitted by the Macro to the Pico UE, the filling in the PDSCH$_{extension\ field}$ is an indication that the radio resources in the control region cannot be used or there is no flag field of PDSCH$_{extension\ field}$ in the RRC signaling of the Pico UE.

In a third manner, when the ePDCCH is transmitted to the UE, a flag bit, i.e., ePDSCH$_{extension\ flag}$, is added in scheduling information DCI of the ePDCCH channel. The ePDSCH$_{extension\ flag}$ has a length of 1 bit, and the bit indicates whether the PDSCH corresponding to the ePDCCH can use the radio resources in the control region. For example, that the value of the bit is "0" represents that the PDSCH corresponding to the ePDCCH cannot use the radio resources in the control region, and that the value of the bit is "1" represents that the PDSCH corresponding to the ePDCCH can use the radio resources in the control region; or that the value of the bit is "1" represents that the PDSCH corresponding to the ePDCCH cannot use the radio resources in the control region, and that the value of the bit is "0" represents that the PDSCH corresponding to the ePDCCH can use the radio resources in the control region. If there is no flag bit ePDSCH$_{extension\ flag}$ in the DCI scheduling information of the ePDCCH channel, the PDSCH corresponding to the ePDCCH cannot use the radio resources in the control region by default.

The radio resources in the control region being not used by the PDSCH for the ePDCCH means that the start position of the PDSCH corresponding to the ePDCCH is indicated by signaling CFI, epdcch-StartSymbol-r11, pdsch-Start-r10 or l$_{EPDCCHStart}$ or the like according to existing standards; and the radio resources in the control region being used by the PDSCH corresponding to the ePDCCH means that the start position if the PDSCH corresponding to the ePDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In the present embodiment, for the Macro UE, as the Macro cannot use the resources in the control region to transmit the PDSCH to the Macro UE, in the ePDCCH channel transmitted by the Macro to the Macro UE, the filling in the ePDSCH$_{extension\ flag}$ is an indication that the radio resources in the control region cannot be used or there is no flag bit ePDSCH$_{extension\ flag}$ in the scheduling information DCI of the ePDCCH channel of the Macro UE, and the scheduling control information of the Macro UE is transmitted to the Macro UE through the ePDCCH channel.

For the Pico UE, if the resources in the control region are scheduled to be used to transmit the PDSCH to the Pico UE, in the ePDCCH channel transmitted by the Macro to the Pico UE, the filling in the ePDSCH$_{extension\ flag}$ is an indication that the radio resources in the control region are used and the scheduling control information of the Pico UE is transmitted to the Pico UE through the ePDCCH channel. If the resources in the control region aren't not used by the scheduling to transmit user service data to the Pico UE, in the ePDCCH channel transmitted by the Macro to the Pico UE, the filling in the ePDSCH$_{extension\ flag}$ is an indication that the radio resources in the control region cannot be used is filled or there is no flag bit of ePDSCH$_{extension\ flag}$ in the scheduling information DCI of the ePDCCH channel of the Pico UE, and the scheduling control information of the Pico UE is transmitted to the Pico UE through the ePDCCH channel.

In a third step, the Macro transmits the PDSCH to the Macro UE and transmits the scheduling control information of the Pico UE to the Pico. In the data region where the control region is removed, the Macro allocates the resources and data mapping of the PDSCH for the Macro UE.

At the Pico Side

In a first step, the Pico receives scheduling information transmitted by the Macro, and determines that the Pico is a service station of the Pico UE and is not a control station of the Pico UE.

Figure 5:
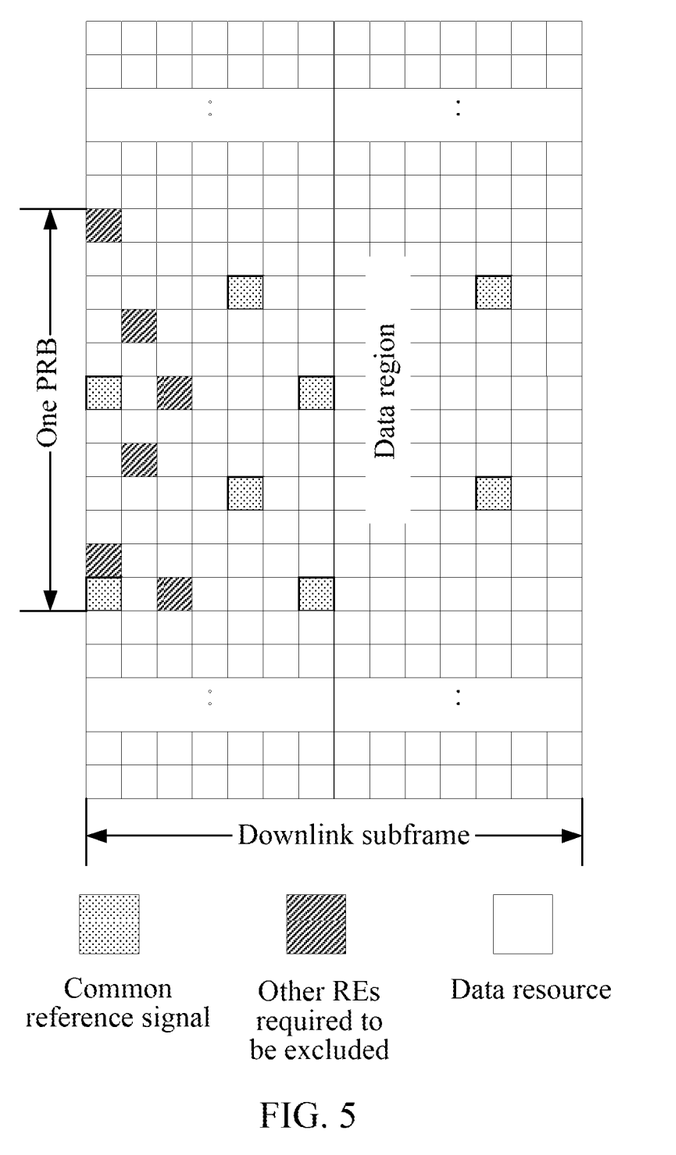
FIG. 5 is a diagram of transmission of a Pico according to an embodiment of the present document.

In a second step, if the resources in the control region are used by the scheduling to transmit the PDSCH to the Pico UE, when the resources of the PDSCH are allocated by the Pico UE, the resources in the control region may be occupied, but it needs to exclude the REs occupied by a CRS, a PCFICH, a PHICH of the Pico and a PDCCH required to be received by the Pico UE on a carrier. If the resources in the control region aren't used by the scheduling to transmit user service data to the Pico UE, when the resources of the PDSCH are allocated by the Pico UE, the resources in the control region cannot be occupied, and only the resources in the data region can be used. FIG. 5 is a diagram of resource allocation of the Pico.

In a third step, the Pico maps and transmits resources of the PDSCH for the Pico UE according to the scheduling information of the Pico UE and the result of the second step, if it is indicated that the resources in the control region are used to transmit the PDSCH to the Pico UE, the Pico maps and transmits the resources of the PDSCH for the Pico UE, and the resources of the PDSCH occupied by the Pico UE start from the first OFDM symbol; and if it is indicated that the resources in the control region are not used to transmit the PDSCH to the Pico UE, the Pico maps and transmits the resources of the PDSCH to the Pico UE, and the start position of the resources of the PDSCH occupied by the Pico UE is determined by the signaling CFI, epdcch-StartSymbol-r11, pdsch-Start-r10 or $1_{EPDCCHStart}$ or the like, as shown in FIG. 5.

At the UE Side

In a first step, scheduling control information is received and parsed. It is confirmed whether the PDSCH of the UE occupies the resources in the control region. The scheduling control information refers to signaling which indicates whether the PDSCH of the UE occupies the resources in the control region, which comprises but is not limited to following manners:

In a first manner, scheduling information DCI of the PDCCH channel is received and parsed, and it is determined whether a flag bit $PDSCH_{extension\ flag}$ exists and the flag bit is parsed according to the same interpretation rule as that of the base station side. The flag bit indicates whether the radio resources in the control region can be used by the PDSCH corresponding to the PDCCH. If there is no flag bit $PDSCH_{extension\ flag}$ in the scheduling information DCI of the PDCCH channel, the PDSCH corresponding to the PDCCH cannot use the radio resources in the control region by default.

The radio resources in the control region being not used by the PDSCH corresponding to the PDCCH means that the start position of the PDSCH corresponding to the PDCCH is indicated by signaling CFI, epdcch-StartSymbol-r11, pdsch-Start-r10 or $1_{EPDCCHStart}$ or the like according to existing standards; and the radio resources in the control region being used by the PDSCH corresponding to the PDCCH means that the start position of the PDSCH corresponding to the PDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In the present embodiment, for the Macro UE, in the DCI information of the PDCCH thereof, according to the same interpretation rule as that of the base station side, the $PDSCH_{extension\ flag}$ is interpreted as that it is unable to use the radio resources in the control region or there is no flag bit $PDSCH_{extension\ flag}$ in the scheduling information DCI of the PDCCH channel of the Macro UE.

In the present embodiment, for the Pico UE, in the DCI information of the PDCCH thereof, the indication of the $PDSCH_{extension\ flag}$ is interpreted according to the same interpretation rule as that of the base station side.

In a second manner, a flag field $PDSCH_{extension\ field}$ in the RRC signaling is received and interpreted, and whether the $PDSCH_{extension\ field}$ exists is determined and the flag field is interpreted according to the same interpretation rule as that of the base station side. The flag field indicates whether the radio resources in the control region can be used by the PDSCH of the UE. If there is no flag field of PDSCH extension field in the RRC signaling, the radio resources in the control region cannot be used by the PDSCH of the UE by default.

The radio resources in the control region being not used by the PDSCH of the UE means that the start position of the PDSCH of the UE is indicated by signaling CFI, epdcch-StartSymbol-r11, pdsch-Start-r10 or $1_{EPDCCHStart}$ or the like according to existing standards; and the radio resources in the control region being used by the PDSCH of the UE means that the start position of the PDSCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In the present embodiment, for the Macro UE, the RRC signaling is received, and according to the same interpretation rule as that of the base station side, the $PDSCH_{extension\ field}$ is interpreted as that it is unable to use the radio resources in the control region or there is no flag field $PDSCH_{extension\ field}$ in the scheduling information DCI of the PDCCH channel of the Macro UE.

In the present embodiment, for the Pico UE, the RRC signaling is received, and the indication of the $PDSCH_{extension\ field}$ is interpreted according to the same interpretation rule as that of the base station side.

In a third manner, scheduling information DCI of the ePDCCH channel is received and parsed, and whether a flag bit $ePDSCH_{extension\ flag}$ exists is determined and the flag bit is parsed according to the same interpretation rule as that of the base station side. The flag bit indicates whether the radio resources in the control region can be used by the PDSCH corresponding to the ePDCCH. If there is no flag bit of $ePDSCH_{extension\ flag}$ in the scheduling information DCI of the ePDCCH channel, the PDSCH corresponding to the ePDCCH cannot use the radio resources in the control region by default.

The radio resources in the control region being not used by the PDSCH for the ePDCCH means that the start position of the PDSCH corresponding to the ePDCCH is indicated by signaling CFI, epdcch-StartSymbol-r11, pdsch-Start-r10 or $1_{EPDCCHStart}$ or the like according to existing standards; and the radio resources in the control region being used by the PDSCH corresponding to the ePDCCH means that the start position of the PDSCH corresponding to the ePDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In the present embodiment, for the Macro UE, in the DCI information of the ePDCCH thereof, according to the same interpretation rule as that of the base station side, the $PDSCH_{extension\ flag}$ is interpreted as that it is unable to use the radio resources in the control region or there is no flag bit $PDSCH_{extension\ flag}$ in the scheduling information DCI of the ePDCCH channel of the Macro UE.

In the present embodiment, for the Pico UE, in the DCI information of the ePDCCH thereof, the indication of the $ePDSCH_{extension\ flag}$ is interpreted according to the same interpretation rule as that of the base station side.

In a third step, the UE receives the PDSCH according to the signaling interpreted in the second step of whether the PDSCH of the UE occupies the radio resources in the control region and an indication of other scheduling control information.

In the present embodiment, the Macro UE receives the PDSCH on corresponding OFDM symbols according to an indication such as the signaling CFI, epdcch-StartSymbol-r11, pdsch-Start-r10 or $1_{EPDCCHStart}$. For the Pico UE, if the Pico UE interprets the signaling as indicating that the resources in the control region are used by the PDSCH, the PDSCH is received from the first OFDM symbol, and REs occupied by a CRS, a PCFICH, a PHICH of a cell where the PDSCH is located and a PDCCH required to be received by the UE in the cell where the PDSCH is located are excluded from the control region; if the Pico UE interprets the signaling as indicating that the resources in the control region are not used to transmit user service data to the Pico UE, the PDSCH is received on corresponding OFDM symbols according to an indication such as the signaling CFI, epdcch-StartSymbol-r11, pdsch-Start-r10 or $l_{EPDCCHStart}$ or the like.

In the present embodiment, the method according to the present document is described in a particular scenario with a HetNet in the LTE/LTE-A system as a coordinated multipoint network. However, the present document is not merely limited to the HetNet scenario, and instead, the present document is applicable to any coordinated multi-point scenario where different stations transmit different information to the same UE.

Embodiment Two

In order to obtain a higher peak data rate, a carrier aggregation is introduced in the LTE-A: the UE supports several component carriers for data transmission, in order to obtain a larger bandwidth (for example, a maximum of 100 MHz), each component carrier is a serving cell, and each UE has a primary serving cell and several secondary serving cells, and in order to better support flexibility of the networking and scheduling, cross-carrier scheduling among component carriers is supported.

In the present embodiment, Cell 1 is the primary serving cell of the UE, Cell 2 is the secondary serving cell of the UE, and downlink cross-carrier scheduling is implemented, scheduling information of the PDSCH transmitted in the Cell 2 using a carrier frequency f2 is indicated by transmitting the PDCCH/ePDCCH of the UE in the Cell 1 using a carrier frequency f1.

At the Cell 1 Side

In a first step, a control region and a service cell of the UE are determined. In the present embodiment, the scheduling information of the PDSCH transmitted by the UE in the Cell 2 using a carrier frequency f2 is indicated by transmitting the PDCCH/ePDCCH of the UE in the Cell 1 using a carrier frequency f1. Therefore, the Cell 1 is the control region of the UE, the Cell 2 is the service station of the UE.

In a second step, it is to indicate through the signaling whether the PDSCH of the UE the Cell 2 occupies the radio resources in the control region. The radio resources in the control region being not used by the PDSCH of the UE in the Cell 2 means that the start position of the PDSCH of the UE in the Cell 2 is indicated by signaling CFI, epdcch-StartSymbol-r11, pdsch-Start-r10 or $l_{EPDCCHStart}$ or the like of the Cell 2; and the radio resources in the control region being used by the PDSCH of the UE in the Cell 2 means that the start position of the PDSCH of the UE in the Cell 2 is the first symbol of a subframe, and when a resource mapping in the control region is performed, the PDSCH does not occupy REs occupied by a CRS, a PCFICH, a PHICH of the Cell 2 and a PDCCH required to be received by the UE in the Cell 2.

Indicating through the signaling whether the PDSCH of the UE occupies the radio resources in the control region of the Cell 2 comprises but is not limited to the following manners:

In a first manner, when the Cell 1 transmits the PDCCH to the UE, a flag bit, i.e., $PDSCH_{extension\ flag}$, is added in scheduling information DCI of the PDCCH channel. The $PDSCH_{extension\ flag}$ has a length of 1 bit, and the bit indicates whether the PDSCH corresponding to the PDCCH can use the radio resources in the control region. For example, that the value of the bit is "0" represents that the PDSCH corresponding to the PDCCH cannot use the radio resources in the control region, and that the value of the bit is "1" represents that the PDSCH corresponding to the PDCCH can use the radio resources in the control region; or that the value of the bit is "1" represents that the PDSCH corresponding to the PDCCH cannot use the radio resources in the control region, and that the value of the bit is "0" represents that the PDSCH corresponding to the PDCCH can use the radio resources in the control region. If there is no flag bit $PDSCH_{extension\ flag}$ in the scheduling information DCI of the PDCCH channel, the PDSCH corresponding to the PDCCH cannot use the radio resources in the control region by default.

In a second manner, when the Cell 1 transmits RRC signaling to the UE, a flag field, i.e. $PDSCH_{extension\ field}$, is added in the RRC signaling. The $PDSCH_{extension\ field}$ has a length of 1 bit, and the bit indicates whether the PDSCH of the UE in the Cell 2 can use the radio resources in the control region. For example, that the value of the bit is "0" represents that the PDSCH of the UE in the Cell 2 cannot use the radio resources in the control region, and that the value of the bit is "1" represents that the PDSCH of the UE in the Cell 2 can use the radio resources in the control region; or that the value of the bit is "1" represents that the PDSCH of the UE in the Cell 2 cannot use the radio resources in the control region, and that the value of the bit is "0" represents that the PDSCH of the UE in the Cell 2 can use the radio resources in the control region. If there is no flag field $PDSCH_{extension\ field}$ in the RRC signaling, the PDSCH of the UE in the Cell 2 cannot use the radio resources in the control region by default.

In a third manner, when the ePDCCH is transmitted to the UE, a flag bit, i.e. $ePDSCH_{extension\ flag}$, is added in DCI scheduling information of the ePDCCH channel. The $ePDSCH_{extension\ flag}$ has a length of 1 bit, and the bit indicates whether the PDSCH corresponding to the ePDCCH can use the radio resources in the control region. For example, that the value of the bit is "0" represents that the PDSCH corresponding to the ePDCCH cannot use the radio resources in the control region, and that the value of the bit is "1" represents that the PDSCH corresponding to the ePDCCH can use the radio resources in the control region; or that the value of the bit is "1" represents that the PDSCH corresponding to the ePDCCH cannot use the radio resources in the control region, and that the value of the bit is "0" represents that the PDSCH corresponding to the ePDCCH can use the radio resources in the control region. If there is no flag bit $ePDSCH_{extension\ flag}$ in the scheduling information DCI of the ePDCCH channel, the PDSCH corresponding to the ePDCCH cannot use the radio resources in the control region by default.

The radio resources in the control region being not used by the PDSCH for the ePDCCH means that the start position of the PDSCH corresponding to the ePDCCH is indicated by signaling CFI, epdcch-StartSymbol-r11, pdsch-Start-r10 or $l_{EPDCCHStart}$ or the like according to existing standards; and the radio resources in the control region being used by the PDSCH corresponding to the ePDCCH means that the start position of the PDSCH corresponding to the ePDCCH of the UE is the first symbol of a subframe, and when a resource mapping in control region is performed, the PDSCH does not occupy REs occupied by a CRS, a PCFICH, a PHICH of a cell where the PDSCH is located and a PDCCH required to be received by the UE in the cell where the PDSCH is located.

In a third step, scheduling control information related to the UE is transmitted by the Cell 1 to the Cell 2.

At the Cell 2 Side

In a first step, a control region and a service cell of the UE are determined. In the present embodiment, the Cell 2 is a service station of the UE.

In a second step, the scheduling control information related to the UE which is transmitted by the Cell 1 is interpreted, and it is determined whether the PDSCH of the UE in the Cell 2 occupies the radio resources in the control region.

In a third step, according to the interpretation in the second step, a resource mapping is performed for the PDSCH of the UE in the Cell 2 and the PDSCH of the UE in the Cell 2 is transmitted.

If it is to indicate that the PDSCH of the UE in the Cell 2 does not use the radio resources in the control region, the start position of the PDSCH of the UE in the Cell 2 is indicated by signaling CFI, epdcch-StartSymbol-r11, pdsch-Start-r10 or $l_{EPDCCHStart}$ or the like of the Cell 2; and if it is to indicate that the PDSCH of the UE in the Cell 2 does not use the radio resources in the control region, the start position of the PDSCH of the UE in the Cell 2 is the first symbol of a subframe, and when a resource mapping in the control region is performed, the PDSCH does not occupy REs occupied by a CRS, a PCFICH, a PHICH of the Cell 2 and a PDCCH required to be received by the UE in the Cell 2.

At the UE Side

In a first step, signaling transmitted by the primary cell, i.e., Cell 1 is received and parsed, determining to implement downlink cross-carrier scheduling, i.e., scheduling information of the UL for the PDSCH transmitted in the Cell 2 using a carrier frequency f2 is indicated by transmitting the PDCCH of the UE in the Cell 1 using a carrier frequency f1. Therefore, it is determined that the Cell 1 is the control region of the UE, and the Cell 2 is the service cell for the UE.

In a second step, scheduling control information transmitted by the Cell 1 is received and parsed, determining whether the PDSCH of the UE in the Cell 2 occupies the resources in the control region. The scheduling control information refers to the signaling which indicates whether the PDSCH of the UE in the Cell 2 occupies the resources in the control region, which comprises but is not limited to the following manners:

In a first manner, scheduling information DCI of the PDCCH channel transmitted by the Cell 1 is received and parsed, and whether a flag bit $PDSCH_{extension\ flag}$ exists is determined and the flag bit is parsed according to the same interpretation rule as that of the base station side. The flag bit indicates whether the radio resources in the control region can be used by the PDSCH corresponding to the PDCCH. If there is no flag bit $PDSCH_{extension\ flag}$ in the DC/scheduling information of the PDCCH channel, the PDSCH corresponding to the PDCCH cannot use the radio resources in the control region by default.

The radio resources in the control region being not used by the PDSCH for the PDCCH means that the start position of the PDSCH corresponding to the PDCCH is indicated by signaling CFI, epdcch-StartSymbol-r11, pdsch-Start-r10 or $l_{EPDCCHStart}$ or the like according to existing standards; and the radio resources in the control region being used by the PDSCH corresponding to the PDCCH means that the start position of the PDSCH corresponding to the PDCCH of the UE is the first symbol of a subframe, and when a resource mapping in the control region is performed, the PDSCH does not occupy REs occupied by a CRS, a PCFICH, a PHICH of a cell (i.e., Cell 2) where the PDSCH is located and a PDCCH required to be received by the UE in the cell (i.e., Cell 2) where the PDSCH is located.

In a second manner, a flag field $PDSCH_{extension\ field}$ in the RRC signaling transmitted by the primary cell, i.e., Cell 1, is received and interpreted, and whether the $PDSCH_{extension\ field}$ of the PDSCH of the Cell 2 exists is determined and the flag field is interpreted according to the same interpretation rule as that of the base station side. The flag field indicates whether the radio resources in the control region can be used by the PDSCH of the UE in the Cell 2. If there is no flag field of PDSCH extension field in the RRC signaling, the radio resources in the control region cannot be used by the PDSCH of the UE in the Cell 2 by default.

The radio resources in the control region being not used by the PDSCH of the UE in the Cell 2 means that the start position of the PDSCH of the UE in the Cell 2 is indicated by signaling CFI, epdcch-StartSymbol-r11, pdsch-Start-r10 or $l_{EPDCCHStart}$ or the like of the Cell 2; and the radio resources in the control region being used by the PDSCH of the UE in the Cell 2 means that the start position of the PDSCH of the UE in the Cell 2 is the first symbol of a subframe, and when a resource mapping in the control region is performed, the PDSCH does not occupy REs occupied by a CRS, a PCFICH, a PHICH of a cell (i.e., Cell 2) where the PDSCH is located and a PDCCH required to be received by the LTE in the cell (i.e., Cell 2) where the PDSCH is located.

In a third step, the UE receives the PDSCH according to the signaling interpreted in the second step of whether the PDSCH of the UE in the Cell 2 occupies the radio resources in the control region and an indication of other scheduling control information. If the UE interprets the signaling as indicating that the resources in the control region are used by the PDSCH, the PDSCH is received from the first OFDM symbol from the Cell 2, and REs occupied by a CRS, a PCFICH, a PHICH of the Cell 2 and a PDCCH required to be received by the UE in the Cell 2 are excluded from the control region. If the Pico UE interprets the signaling as indicating that the resources in the control region are not used to transmit the PDSCH of the user to the Pico UE, the PDSCH is received on corresponding OFDM symbols according to an indication such as the signaling CFI, epdcch-StartSymbol-r11, pdsch-Start-r10 or $l_{EPDCCHStart}$ or the like.

In the present embodiment, the method according to the present document is described in a downlink two-carrier aggregation scenario in the LTE/LTE-A system. However, the present document is not merely limited to the downlink two-carrier aggregation scenario, and instead, the present document is applied to a multi-carrier aggregation scenario.

Figure 6:
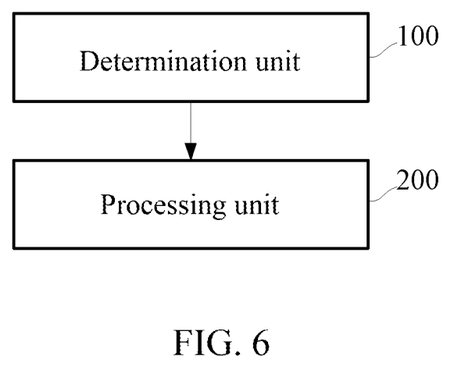
FIG. 6 is a structural diagram of an apparatus for indicating downlink resources of a coordinated multi-point network in an LTE system according to an embodiment of the present document.

As shown in FIG. 6, the embodiments of the present document further correspondingly provide an apparatus for indicating downlink resources of a coordinated multi-point network in an LTE system, comprising:

a determination unit 100 configured to determine a control station/cell and a service station/cell of a UE; and a processing unit 200 configured to indicate through signaling that a PDSCH of the UE occupies radio resources of the service station/cell which does not a control channel in a control region, whereby a start position of the PDSCH allocated for the UE by the service station/cell is the first symbol of a subframe, and when a resource mapping in the control region is performed, the PDSCH does not occupy REs occupied by a CRS, a PCFICH, a PHICH of a station/cell where the PDSCH is located and a PDCCH of the UE.

In the present embodiment, determining a control station/cell and a service station/cell of a UE by the determination unit 100 comprises:

1) determining which station/cell in the system is the control station/cell of the UE and which station/cell in the system is the service station/cell of the UE; and 2) further determining whether the control station/cell and the service station/cell of the UE are the same station/cell.

In the present embodiment, specifically, if the determination unit 100 determines that the control station/cell and the service station/cell of the UE are not the same station/cell, the determination unit transmits a notification to the processing unit 200 to notify that the processing unit 200 can indicate through the signaling that the PDSCH of the UE occupies the radio resources of the service station/cell in the control region.

In the present embodiment, if the processing unit 200 indicates through the signaling that the PDSCH of the UE does not occupy the radio resources of the service station/cell which does not transmit a control channel in the control region, the start position of the PDSCH allocated by the service station/cell to the UE is indicated by signaling CFI, epdcch-StartSymbol-r11, pdsch-Start-r10 or $l_{EPDCCHStart}$ or the like according to existing standards.

In the present embodiment, a strategy of indicating by the processing unit 200 through the signaling that the PDSCH of the UE occupies the radio resources of the service station/cell which does not transmit a control channel in the control region is:

1) when the control station/cell transmits a PDCCH to the UE, adding, by the processing unit 200, a flag bit $PDSCH_{extension\ flag}$ in scheduling information DCI of the PDCCH channel for indicating that a PDSCH corresponding to the PDCCH can use the radio resources of the service station/cell in the control region;

2) or, when the control station/cell transmits a RRC signaling to the UE, adding, by the processing unit 200, a flag field $PDSCH_{extension\ field}$ in the RRC signaling for indicating that the PDSCH of the UE can use the radio resources of the service station/cell in the control region;

3) or, when the control station/cell transmits an ePDCCH to the UE, adding, by the processing unit 200, a flag bit $ePDSCH_{extension\ flag}$ in DCI of the ePDCCH channel for indicating that a PDSCH corresponding to the ePDCCH can use the radio resources of the service station/cell in the control region.

Herein, the $PDSCH_{extension\ flag}$, the $PDSCH_{extension\ field}$ or the $ePDSCH_{extension\ flag}$ has a length of 1 bit, and a value of the bit is used to indicate whether the PDSCH can use the radio resources in the control region.

In a specific implementation, the determination unit 100 and the processing unit 200 described above may be achieved by a Central Processing Unit (CPU), a Micro Processing Unit (MPU), a Digital Signal Processor (DSP) or a Field Programmable Gate Array (FPGA) of the apparatus for indicating downlink resources.

Correspondingly, the embodiments of the present document further provide a wireless communication system comprising the apparatus for indicating downlink resources of a coordinated multi-point network in an UE system described above, and as also shown in FIG. 6, the apparatus comprises:

a determination unit 100 configured to determine a control station/cc and a service station/cell of a UE; and a processing unit 200 configured to indicate through signaling that a PDSCH of the UE occupies radio resources of the service station/cell which does not a control channel in a control region, whereby a start position of the PDSCH allocated by the service station/cell to the UE is the first symbol of a subframe, and when a resource mapping in the control region is performed, the PDSCH does not occupy REs occupied by a CRS, a PCFICH, a PHICH of a station/cell where the PDSCH is located and a PDCCH of the UE.

In a specific implementation, the apparatus for indicating downlink resources of a coordinated multi-point network in an LTE system may be deployed at the base station side. Specific description of the apparatus can be known with reference to the above content, and will not be repeated here.

Embodiment Three

The ePDCCH can not only exist in compatible carriers, but also can be a New Carrier Type (NCT) of downlink control channel. When the ePDCCH is used for controlling scheduling, if there is no need to transmit a control signal in a control region of the cell, the PDSCH also cannot use the resources in the control region, and thus there is also a problem of a waste of radio resources. In the present embodiment, the present document can solve the problem of a waste of radio resources due to being incapable of using the resources in the control region by the PDSCH if there is no need to transmit a control signal in a control region of the cell when the ePDCCH is used for controlling scheduling.

In the present embodiment, scheduling information of a part of the PDSCH (for example, the PDSCH which carries a part of the RRC signaling) of the UE is transmitted by a base station through the PDCCH, and scheduling information of a part of the PDSCH (for example, the PDSCH which carries service data) of the UE is transmitted by the base station through the ePDCCH.

At the Base Station Side

In a first step, a control region and a service cell of the UE are determined. In the present embodiment, the base station is not only a control region of the UE, but also a service station of the UE.

In a second step, it is to indicate through the signaling whether the PDSCH corresponding to the ePDCCH of the UE occupies the radio resources in the control region. The radio resources in the control region being not used by the PDSCH corresponding to the ePDCCH of the UE means that the start position of the PDSCH corresponding to the ePDCCH of the UE is indicated by signaling CFI, epdcch-StartSymbol-r11, pdsch-Start-r10 or $l_{EPDCCHStart}$ or the like according to existing standards; and the radio resources in the control region being used by the PDSCH corresponding to the ePDCCH of the UE means that the start position of the PDSCH of the UE is the first symbol of a subframe, and when a resource mapping in the control region is performed, the PDSCH does not occupy REs occupied by a CRS, a PCFICH, a PHICH and a PDCCH required to be received by the UE in a cell.

Indicating through the signaling whether the PDSCH of the UE occupies the radio resources in the control region comprises but is not limited to the following manners:

In a first manner, when the ePDCCH is transmitted by the base station to the LTE, a flag bit, i.e. $PDSCH_{extension\ flag}$, is added in scheduling information DCI of the ePDCCH channel. The $PDSCH_{extension\ flag}$ has a length of 1 bit, and of the bit indicates whether the PDSCH corresponding to the ePDCCH can use the radio resources in the control region. For example, that the value of the bit is "0" represents that the PDSCH corresponding to the ePDCCH cannot use the radio resources in the control region, and that the value of the bit is "1" represents that the PDSCH corresponding to the ePDCCH can use the radio resources in the control region; or that the value of the bit is "1" represents that the PDSCH corresponding to the ePDCCH cannot use the radio resources in the control region, and that the value of the bit is "0" represents that the PDSCH corresponding to the ePDCCH can use the radio resources in the control region. If there is no flag bit $PDSCH_{extension\ flag}$ in the scheduling information DCI of the ePDCCH channel, the PDSCH corresponding to the ePDCCH cannot use the radio resources in the control region by default.

In a second manner, when the base station transmits RRC signaling to the UE, a flag field, i.e. $PDSCH_{extension\ field}$, is added in the RRC signaling. The $PDSCH_{extension\ field}$ has a length of 1 bit, and the bit indicates whether the PDSCH corresponding to the ePDCCH of the UE can use the radio resources in the control region. For example, that the value of the bit is "0" represents that the PDSCH corresponding to the ePDCCH of the UE cannot use the radio resources in the control region, and that the value of the bit is "1" represents that the PDSCH corresponding to the ePDCCH of the UE can use the radio resources in the control region; or that the value of the bit is "1" represents that the PDSCH corresponding to the ePDCCH of the UE cannot use the radio resources in the control region, and that the value of the bit is "0" represents that the PDSCH corresponding to the ePDCCH of the UE can use the radio resources in the control region. If there is no flag field of $PDSCH_{extension\ field}$ in the RRC signaling, the PDSCH corresponding to the ePDCCH of the UE cannot use the radio resources in the control region by default.

In a third step, the base station performs the resource mapping of the PDSCH and the transmission of the PDSCH for the UE. If the resources in the control region are used to transmit the PDSCH to the UE, the base station performs the resource mapping of the PDSCH and the transmission of the PDSCH for the UE, and the resources of the PDSCH occupied by the UE start from the first OFDM symbol. If the resources in the control region are not used to transmit the PDSCH to the UE, the base station performs the resource mapping of the PDSCH and the transmission of the PDSCH for the UE, and the start position of the downlink data resources occupied by the UE is determined according to indication information such as the signaling CFI, epdcch-StartSymbol-r11, pdsch-Start-r10 or $l_{EPDCCHStart}$ or the like.

At the UE Side

In a first step, scheduling control information is received and parsed, determining whether the PDSCH corresponding to the ePDCCH of the UE occupies the resources in the control region. The scheduling control information refers to signaling which indicates whether the PDSCH corresponding to the ePDCCH of the UE occupies the resources in the control region, which comprises but is not limited to following manners:

In a first manner, scheduling information DCI of the ePDCCH channel is received and parsed, and whether a flag bit $PDSCH_{extension\ flag}$ exists is determined and the flag bit is parsed according to the same interpretation rule as that of the base station side. The flag bit indicates whether the radio resources in the control region can be used by the PDSCH corresponding to the ePDCCH. If there is no flag bit $PDSCH_{extension\ flag}$ in the scheduling information DCI of the ePDCCH channel, the PDSCH corresponding to the ePDCCH cannot use the radio resources in the control region by default.

The radio resources in the control region being not used by the PDSCH fox the ePDCCH means that the start position of the PDSCH corresponding to the ePDCCH is indicated by signaling CFI, epdcch-StartSymbol-r11, pdsch-Start-r10 or $l_{EPDCCHStart}$ or the like according to existing standards; and the radio resources in the control region being used by the PDSCH corresponding to the ePDCCH means that the start position of the PDSCH corresponding to the ePDCCH of the UE is the first symbol of a subframe, and when a resource mapping in control region is performed, the PDSCH does not occupy REs occupied by a CRS, a PCFICH, a PHICH of a cell where the PDSCH is located and a PDCCH required to be received by the UE in the cell where the PDSCH is located.

In a second manner, a flag field $PDSCH_{extension\ field}$ in the RRC signaling is received and interpreted, and whether the $PDSCH_{extension\ field}$ exists is determined and the flag field is interpreted according to the same interpretation rule as that of the base station side. The flag field indicates whether the radio resources in the control region can be used by the PDSCH corresponding to the ePDCCH of the UE. If there is no flag field $PDSCH_{extension\ field}$ in the RRC signaling, the radio resources in the control region cannot be used by the PDSCH corresponding to the ePDCCH of the UE by default.

The radio resources in the control region being not used by the PDSCH corresponding to the ePDCCH of the UE means that the start position of the PDSCH corresponding to the ePDCCH of the UE is indicated by signaling CFI, epdcch-StartSymbol-r11, pdsch-Start-r10 or $l_{EPDCCHStart}$ or the like according to existing standards; and the radio resources in the control region being used by the PDSCH corresponding to the ePDCCH of the UE means that the start position of the PDSCH corresponding to the ePDCCH of the UE is the first symbol of a subframe, and when a resource mapping in the control region is performed, the PDSCH does not occupy REs occupied by a CRS, a PCFICH, a PHICH of a cell where the PDSCH is located and a PDCCH required to be received by the UE in the cell where the PDSCH is located.

In a third step, the UE receives the PDSCH corresponding to the ePDCCH according to the signaling interpreted in the second step of whether the PDSCH of the UE in the Cell 2 occupies the radio resources in the control region and an indication of other scheduling control information. If the UE interprets the signaling as indicating that the resources in the control region are used by the PDSCH, the PDSCH is received from the first OFDM symbol, and REs occupied by a CRS, a PCFICH, a PHICH and a PDCCH required to be received by the UE is located are excluded from the control region. If the UE interprets the signaling as indicating that the resources in the control region are not used to transmit the PDSCH corresponding to the ePDCCH of the UE to the UE, the PDSCH corresponding to the ePDCCH is received on corresponding OFDM symbols according to an indication such as the signaling CFI, epdcch-StartSymbol-r11, pdsch-Start-r10 or $l_{EPDCCHStart}$ or the like.

In the present embodiment, the method according to the present document is described in a particular scenario with compatible carriers in the LTE/LTE-A system where downlink DCI scheduling information is transmitted through the ePDCCH. However, the present document is not merely limited to the compatible carrier scenario, and instead, the present document is applicable to any scenario of using the ePDCCH to transmit the downlink DCI scheduling information.

The embodiments of the present document further provide a computer readable storage medium comprising a set of computer executable instructions for implementing the method for indicating downlink resources of a coordinated multi-point network in an UE system according to the embodiments of the present document.

The above description is merely preferable embodiments of the present document, instead of limiting the patent scope of the present document. Any equivalent structure or equivalent flow transformation, which is made according to the specification and accompanying drawings of the present document, no matter whether being directly or indirectly applied in other related technical fields, should be included in the patent protection scope of the present document.

What is claimed is:

1. A method for indicating downlink resources of a coordinated multi-point network in an LTE system, comprising:
   determining a control station or cell and a service station or cell of a User Equipment (UE); and
   indicating, through signaling, a Physical Downlink Shared Channel (PDSCH) of the UE to occupy radio resources in a control region of the service station or cell which does not transmit though a control channel in the control region, whereby a start position of the PDSCH allocated for the UE by the service station or cell is a first symbol of a subframe, and when a resource mapping in the control region is performed, the PDSCH does not occupy a Cell Reference Signal (CRS), a Physical Control Format Indicator Channel (PCFICH), a Physical Hybrid-ARQ Indicator Channel (PHICH) of a station or cell where the PDSCH is located and Resource Elements (REs) occupied by a Physical Downlink Control Channel (PDCCH) of the UE.

2. The method for indicating downlink resources of a coordinated multi-point network in an LTE system according to claim 1, wherein determining a control station or cell and a service station or cell of a UE comprises:
   determining which station or cell in the system is the control station or cell of the UE and which station or cell in the system is the service station or cell of the UE.

3. The method for indicating downlink resources of a coordinated multi-point network in an LTE system according to claim 2, wherein if the control station or cell and the service station or cell of the UE are not the same station or cell, it is to indicate through the signaling that the PDSCH of the UE occupies the radio resources of the service station or cell in the control region.

4. The method for indicating downlink resources of a coordinated multi-point network in an LTE system according to claim 1, wherein if it is to indicate through the signaling that the PDSCH of the UE does not occupy the radio resources of the service station or cell in the control region, the start position of the PDSCH allocated for the UE by the service station or cell is indicated by signaling Control Format Indication, CFI, epdcch-StartSymbol-r11, pdsch-Start-r10 or $l_{EPDCCHStart}$ according to existing standards.

5. The method for indicating downlink resources of a coordinated multi-point network in an LTE system according to claim 1, wherein a strategy of indicating through the signaling that a Physical Downlink Shared Channel (PDSCH) of the UE occupies radio resources of the service station or cell in a control region is:
   when the control station or cell transmits a PDCCH to the UE, adding a flag bit $PDSCH_{extension\ flag}$ in scheduling information, Downlink Control Information, DCI, of the PDCCH channel for indicating that a PDSCH corresponding to the PDCCH can use the radio resources of the service station or cell in the control region;
   or, when the control station or cell transmits a Radio Resource Control (RRC) signaling to the UE, adding a flag field $PDSCH_{extension}$ field in the RRC signaling for indicating that the PDSCH of the UE can use the radio resources of the service station or cell in the control region;
   or, when the control station or cell transmits an enhanced Physical Downlink Control Channel (ePDCCH) to the UE, adding a flag bit $ePDSCH_{extension\ flag}$ in Downlink Control Information, DCI, of the ePDCCH channel for indicating that a PDSCH corresponding to the ePDCCH can use the radio resources of the service station or cell in the control region.

6. The method for indicating downlink resources of a coordinated multi-point network in an LTE system according to claim 5, wherein the $PDSCH_{extension\ flag}$, the $PDSCH_{extension\ field}$ or the $ePDSCH_{extension\ flag}$ has a length of 1 bit, and a value of the bit is used to indicate whether the PDSCH can use the radio resources in the control region.

7. An apparatus for indicating downlink resources of a coordinated multi-point network in an LTE system, comprising
   a processor and
   a storage device, wherein the storage device stores processor-executable programs, and the programs comprise: a determination unit, configured to determine a control station or cell and a service station or cell of a User Equipment (UE); and a processing unit, configured to indicate, through signaling, a Physical Downlink Shared Channel (PDSCH) of the UE to occupy radio resources in a control region of the service station or cell which does not transmit though a control channel in the control region, whereby a start position of the PDSCH allocated for the UE by the service station or cell is a first symbol of a subframe, and when a resource mapping in the control region is performed, the PDSCH does not occupy a Cell Reference Signal (CRS), a Physical Control Format Indicator Channel (PCFICH), a Physical Hybrid-ARQ Indicator Channel (PHICH) of a station or cell where the PDSCH is located and Resource Elements (REs) occupied by a Physical Downlink Control Channel (PDCCH) of the UE.

8. The apparatus for indicating downlink resources of a coordinated multi-point network in an LTE system according to claim 7, wherein determining a control station or cell and a service station or cell of a UE by the determination unit comprises:
   determining which station or cell in the system is the control station or cell of the UE and which station or cell in the system is the service station or cell of the UE.

9. The apparatus for indicating downlink resources of a coordinated multi-point network in an LTE system according to claim 8, wherein if the determination unit determines that the control station or cell and the service station or cell of the UE are not the same station or cell, the determination unit transmits a notification to the processing unit to notify that the processing unit can indicate through the signaling that the PDSCH of the UE occupies the radio resources of the service station or cell in the control region.

10. The apparatus for indicating downlink resources of a coordinated multi-point network in an LTE system according to claim 7, wherein if the processing unit indicates through the signaling that the PDSCH of the UE does not occupy the radio resources of the service station or cell which does not transmit a control channel in the control region, the start position of the PDSCH allocated for the UE by the service station or cell is indicated by signaling Control Format Indication, CFI, epdcch-StartSymbol-r11, pdsch-Start-r10 or $l_{EPDCCHStart}$ according to existing standards.

11. The apparatus for indicating downlink resources of a coordinated multi-point network in an LTE system according to claim 7, wherein a strategy of indicating by the processing unit through the signaling that the PDSCH of the UE occupies the radio resources of the service station or cell which does not transmit a control channel in the control region is:

when the control station or cell transmits a PDCCH to the UE, adding, by the processing unit, a flag bit $PDSCH_{extension\ flag}$ in scheduling information, Downlink Control Information, DCI, of the PDCCH channel for indicating that a PDSCH corresponding to the PDCCH can use the radio resources of the service station or cell in the control region;

or, when the control station or cell transmits a Radio Resource Control (RRC) signaling to the UE, adding, by the processing unit, a flag field $PDSCH_{extension\ field}$ in the RRC signaling for indicating that the PDSCH of the UE can use the radio resources of the service station or cell in the control region;

or, when the control station or cell transmits an enhanced Physical Downlink Control Channel (ePDCCH) to the UE, adding, by the processing unit, a flag bit $ePDSCH_{extension\ flag}$ in Downlink Control Information, DCI, of the ePDCCH channel for indicating that a PDSCH corresponding to the ePDCCH can use the radio resources of the service station or cell in the control region.

12. The apparatus for indicating downlink resources of a coordinated multi-point network in an LTE system according to claim 11, wherein the $PDSCH_{extension\ flag}$, the $PDSCH_{extension\ field}$ or the $ePDSCH_{extension\ flag}$ has a length of 1 bit, and a value of the bit is used to indicate whether the PDSCH can use the radio resources in the control region.

13. A wireless communication system comprising
an apparatus for indicating downlink resources of a coordinated multi-point network in an LTE system,
the apparatus comprises a processor and a storage device, wherein the storage device stores processor-executable programs, and the programs comprise: a determination unit, configured to determine a control station or cell and a service station or cell of a User Equipment (UE); and a processing unit, configured to indicate, through signaling, a Physical Downlink Shared Channel (PDSCH) of the UE to occupy radio resources in a control region of the service station or cell which does not transmit though a control channel in the control region, whereby a start position of the PDSCH allocated for the UE by the service station or cell is a first symbol of a subframe, and when a resource mapping in the control region is performed, the PDSCH does not occupy a Cell Reference Signal (CRS), a Physical Control Format Indicator Channel (PCFICH), a Physical Hybrid-ARQ Indicator Channel (PHICH) of a station or cell where the PDSCH is located and Resource Elements (REs) occupied by a Physical Downlink Control Channel (PDCCH) of the UE.

14. A non-transitory computer readable storage medium comprising a set of computer executable instructions for implementing the method for indicating downlink resources of a coordinated multi-point network in an LTE system according to claim 1.

* * * * *